United States Patent [19]

Yoshikawa et al.

[11] Patent Number: 5,786,812
[45] Date of Patent: Jul. 28, 1998

[54] TABLET POINTER

[75] Inventors: Osamu Yoshikawa; Ryo Okamura; Minekazu Miyazaki; Noriyuki Nakanishi, all of Tokyo, Japan

[73] Assignee: SMK Corporation, Tokyo, Japan

[21] Appl. No.: 661,451

[22] Filed: Jun. 11, 1996

[30] Foreign Application Priority Data

Jun. 27, 1995 [JP] Japan .................................. 7-182272

[51] Int. Cl.$^6$ ........................................................ G09G 5/00
[52] U.S. Cl. .................................................. 345/173; 173/179
[58] Field of Search ......................................... 345/179, 173, 345/157, 156, 145, 146, 163, 180, 182, 183, 184, 104; 178/18, 19

[56] References Cited

U.S. PATENT DOCUMENTS

5,327,161  7/1994  Logan et al. ............................. 345/173
5,481,278  1/1996  Shigemastu et al. ..................... 345/179

*Primary Examiner*—Xiao Wu
*Attorney, Agent, or Firm*—Armstrong, Westerman, Hattori, McLeland & Naughton

[57] ABSTRACT

The invention concerns a tablet pointer that enables the drag mode to be retained even when the operation surface of a tablet sheet is so narrow that the stylus press-held thereto needs to be temporarily lifted off. Switch data generating member provided in the tablet pointer produces switch data indicating the operating state of a mouse switch and device output data of the tablet pointer is fed to a personal computer as an output of an operation unique to the mouse, such as drag mode data. While in a keep-drag mode, the switch data generating member does not cancel the drag mode even if it is supplied with an ordinary drag cancel input. Hence, the drag mode can be retained even if it receives a drag mode cancel signal during the drag operation.

6 Claims, 5 Drawing Sheets

TABLET POINTER

BACKGROUND OF THE INVENTION

1. Field of the Invention

The present invention relates to a tablet pointer of the type wherein a stylus, pen, finger, or similar is moved or dragged on a tablet sheet while being press-held thereto to control a cursor on the screen of a personal computer in the same manner as in the case of a mouse and, more particularly, to a tablet pointer which outputs device data corresponding to a mouse drag mode.

2. Description of the Prior Art

With recent developments in GUI (Graphical User Interface) environments, a mouse has now come into wide use as a pointing device for personal computers (hereinafter referred to simply as PCs).

That is, the mouse is dragged on an operation pad and the distance dragged is output as mouse drag data to a PC to control the movement of the cursor on the PC screen. By operating the mouse switch to perform a manipulation unique to the mouse, such as a click, double click or dragging, while at the same time moving the cursor to an icon on the PC screen, an instruction associated with the icon is input into the PC.

Figure 7:
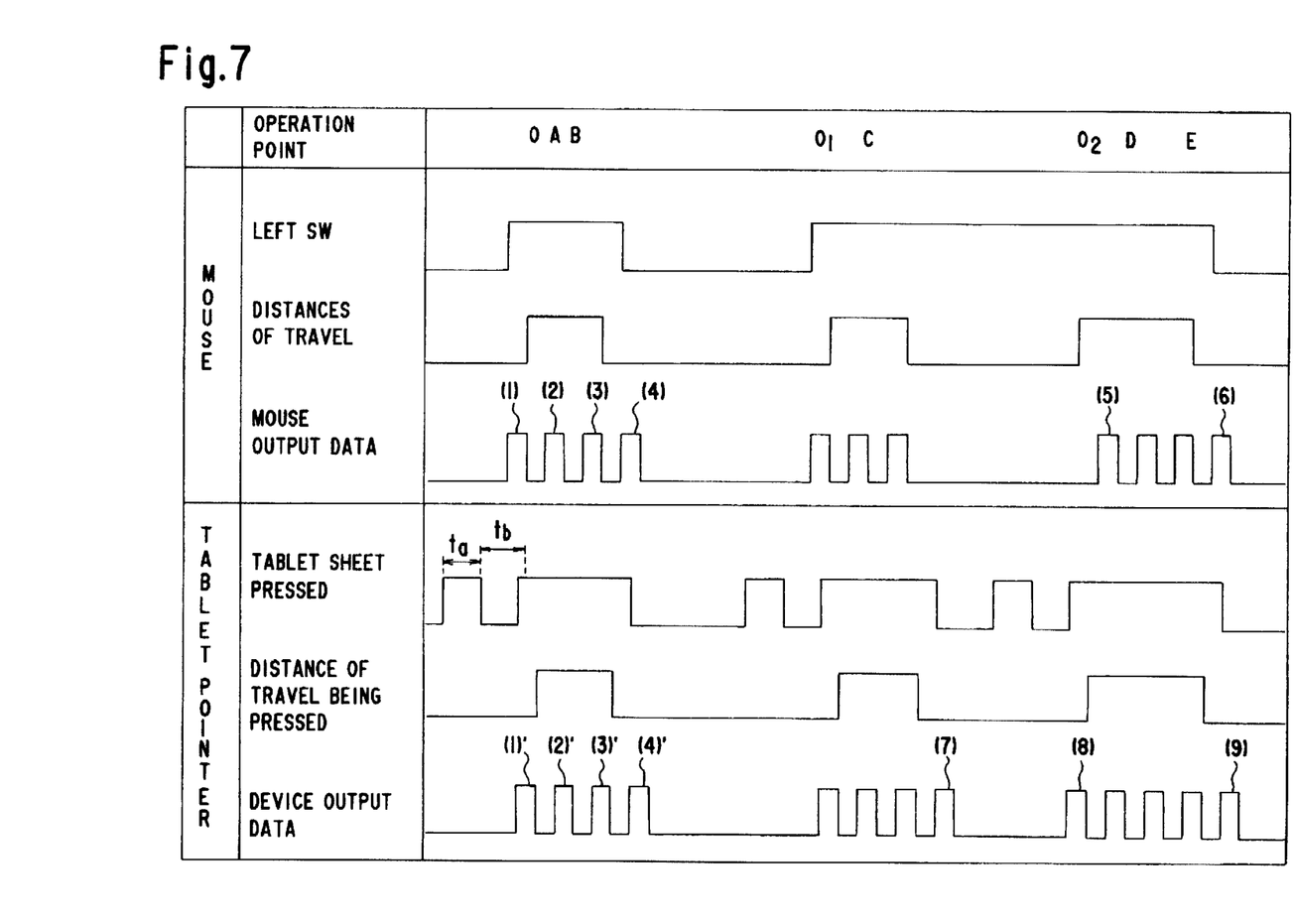
FIG. 7 is a waveform diagram showing respective operations of a conventional tablet pointer 100 and its device output data.

FIG. 7 is a waveform diagram showing the relationship between the operation of the mouse and its output data in the drag mode.

TABLE 1

| Bit No. | MSB 6 | 5 | 4 | 3 | 2 | 1 | LSB 0 |
|---|---|---|---|---|---|---|---|
| First Byte | 1 | L | R | Y7 | Y6 | X7 | X6 |
| Second Byte | 0 | X5 | X4 | X3 | X2 | X1 | X0 |
| Third Byte | 0 | Y5 | Y4 | Y3 | Y2 | Y1 | Y0 |

Table 1 shows the format of the mouse output data. Device output data of three bytes contains switch data (L, R) representing the states of left and right switches of the mouse and mouse drag data consisting of the distances traveled, X and Y, in the x and y directions. The distance of travel X in the x direction is contained in the bit positions indicated by X0 to X7 and the distance of travel Y in the y direction in the bit positions indicated by Y0 to Y7.

TABLE 2

|  | Switch Data | | Distance-traveled Data | |
|---|---|---|---|---|
|  | L | R | X | Y |
| (1) |  | 1 | 0 | 0 | 0 |
| (2) |  | 1 | 0 | $X_A$ | $Y_A$ |
| (3) |  | 1 | 0 | $X_B$ | $Y_B$ |
| (4) | (6) | 0 | 0 | 0 | 0 |
| (5) |  | 1 | 0 | $X_D$ | $Y_D$ |

Table 2 shows switch data (L, R) and mouse drag data (X, Y) contained in the mouse output data (1) to (6) provided in the format of Table 1 in the case of FIG. 7.

Figure 5:
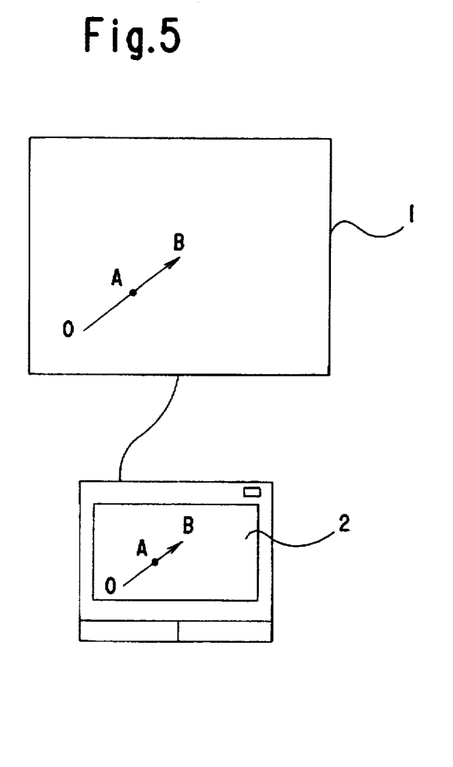
FIG. 5 is a diagram for explaining the single dragging relationship between a mouse and a cursor on the screen of a personal computer 1.

While in the drag mode, it is customary to drag the mouse on the pad while depressing its left switch as shown in FIG. 7. For example, when the mouse is dragged on the pad from a point "O" to "B" as depicted in FIG. 5, mouse output data (1) to (4) are fed to a PC 1 as shown in FIG. 7.

Since in such a case the PC 1 processes the mouse output data as that provided in the mouse drag mode, the mouse output data (2) that the switch data L is, for example, at "1" indicating the depression of the left switch and that the mouse drag data (X, Y) take predetermined values $X_A$ and $Y_A$ indicating the distances of travel of the mouse in the x and y directions, as depicted in Table 2, is processed as mouse output data in the drag mode.

When the mouse output data in the drag mode is followed by the mouse output data (4) that the switch data L has changed from "1" to "0" indicating the release of the left switch, the mouse will leave the drag mode.

Figure 6:
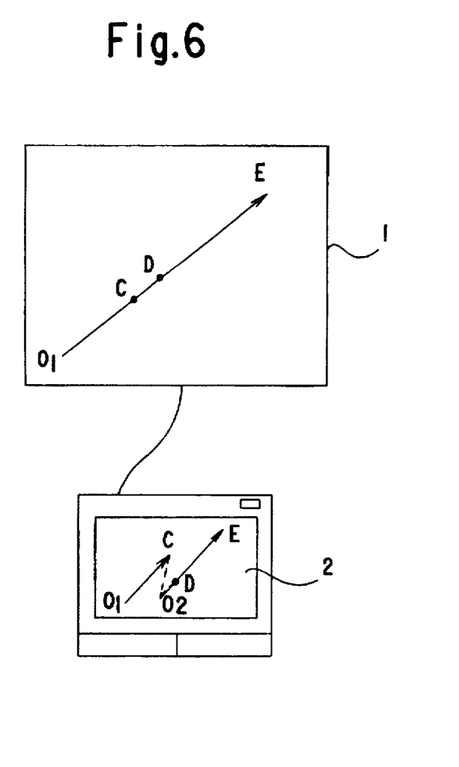
FIG. 6 is a diagram for explaining the double dragging relationship between the mouse and the cursor on the PC screen.

Accordingly, even when the mouse is temporarily lifted off of the pad at a position C in the drag mode and then dragged again starting from a position $O_2$ as shown in FIG. 6, the mouse will remain in the drag mode unless its left switch is released.

That is, mouse drag data $X_D$ and $Y_D$ of the mouse output data (5) in Table 2 indicate the distances of travel of the mouse relative to the position C, which are judged by the PC 1 as mouse output data in a continuous or uninterrupted drag mode.

Since the mouse needs to be dragged on the operation pad, however, it is difficult, in the case of notebook or portable PCs, to find room for manipulating the mouse on the move; besides, the mouse has a size and shape unsuitable for transportation as part of such a PC.

Figure 4:
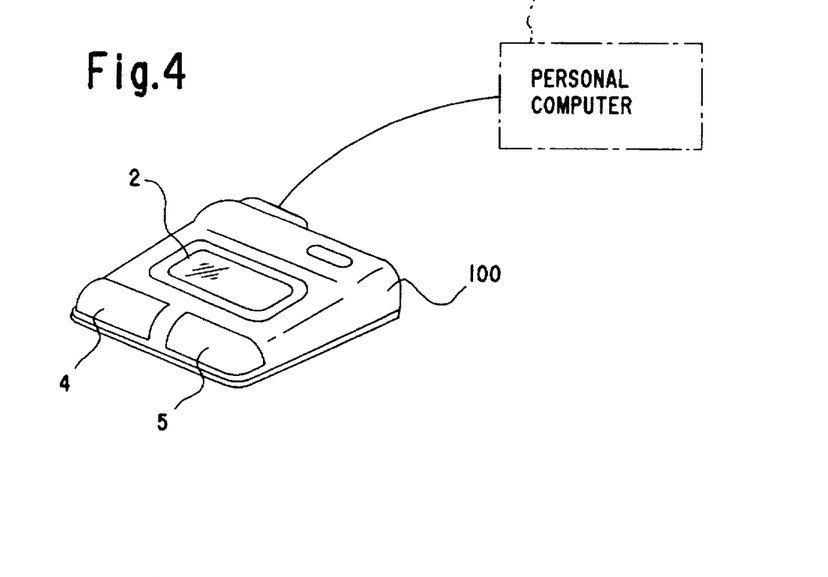
FIG. 4 is a perspective view of a conventional tablet pointer.

As a solution to this problem, there has been developed such a low-profile tablet pointer 100 as shown in FIG. 4 which has a tablet sheet 2 as an input surface.

The tablet pointer 100 detects the position of pressure applied to the tablet sheet 2 by the same means as position detecting means used in a well-known electrostatic capacitance or resistance contact type tablet.

For example, when moving a finger pressed against the tablet sheet 2, data on the distance traveled is computed from the difference between the current and immediately preceding positions of the finger on the tablet sheet 2 upon each detection of a change in the position of the pressure applied thereto. This distance-traveled data consists of the distances traveled, X and Y, in the x and y directions and is fed to the PC 1 as distance-traveled data (X, Y) forming part of the device output data.

This device output data corresponds to the aforementioned mouse output data, and the format of the mouse output data is used in common with the device output data so that the tablet pointer 100 is compatible with the mouse.

Accordingly, by moving the finger urged against the tablet sheet 2, the cursor can be moved on the screen of the PC 1 as if the mouse is operated.

As depicted in FIG. 4, the tablet pointer 100 also has a pair of left and right push-button switches 4 and 5 corresponding to the mouse switches and is capable of performing operations similar to the aforementioned ones unique to the mouse. In practice, however, since the tablet pointer 100 is low-profile and small, it is hard to manipulate the tablet sheet 2 and the push-button switches 4 and 5 with one hand.

To overcome such a disadvantage of the prior art, there has been proposed a tablet pointer 100 of the type producing switch data that changes by a click, double click or similar based on an operation pattern that is a combination of the number of taps on the tablet sheet 2 and the tablet sheet's state of being pressed.

In FIG. 7 a timing chart of this conventional tablet pointer 100 in the drag mode is shown in comparison with the timing chart of the aforementioned mouse also in the drag mode.

The tablet pointer 100 is switched to the drag mode by pressing the tablet sheet 2 by a single tap with a finger or stylus for a time $t_a$ then pressing the sheet 2 again within a time $t_b$ and moving the finger or stylus urged against it.

When the periods $t_a$ and $t_b$ in the above operations satisfy predefined conditions for operation patterns in the drag mode, the tablet pointer 100 produces switch data corresponding to the depression of the mouse switch and provides device output data in the drag mode to the PC 1.

Moving the finger or stylus off the tablet sheet 2 while in the drag mode, switch data corresponding to the release of the mouse switch is produced. Then, device output data (4)', containing the switch data, is fed to the PC 1 and the drag mode is canceled.

Device output data (1)' to (4)' thus provided are the same as the mouse output data (1) to (4) produced by the corresponding mouse operations.

The above-described tablet pointer 100 retains compatibility with the mouse and can be switched to the drag mode by tapping the tablet sheet 2 but cannot be held in the drag mode when it is necessary to remove the finger or stylus press-held to the tablet sheet 2.

For example, in the case of moving the cursor on the PC screen from a point $O_1$ to E in the drag mode as shown in FIG. 6, the pressing of the tablet sheet 2 needs to be terminated at a point C and then resumed at a point $O_2$. In this instance, since the pressing of the tablet sheet 2 is temporarily stopped at the point C as shown in FIG. 7, device output data (7) is provided which contains switch data corresponding to the release of the mouse switch (see Table 3) and the drag mode is canceled accordingly.

TABLE 3

|     |     | Switch Data | | Distance-traveled Data | |
| --- | --- | --- | --- | --- | --- |
|     |     | L | R | X | Y |
| (7) | (9) | 0 | 0 | 0 | 0 |
| (8) |     | 1 | 0 | 0 | 0 |

Table 3 shows switch data (L, R) and distance-traveled data (X, Y) of device output data (7) to (9) provided in the same format as in Table 1 in the operations described above in respect of FIG. 7.

To reenter the drag mode at the point $O_2$ in FIG. 6, it is necessary to tap the tablet sheet 2 at that point as shown in FIG. 7. Even if the drag mode is thus resumed, the PC 1 does not continuously perform drag processing in response to a series of operations for moving the cursor from the point $O_1$ to E; namely, drag processing is carried out separately for each of the operations from the point $O_1$ to C and from $O_2$ to E.

Thus, drag processing is carried out at the point C on the PC screen, but if no drag processing can be executed at this point, an error will be induced, making it impossible to perform dragging from the point $O_1$ to E on the screen.

Further, since the tablet pointer 100 is required to be provided in a shape suitable for transportation as referred to previously herein, the tablet sheet 2 is forced to reduce its operation surface--this is still left unsolved as a problem specific to the conventional tablet pointer 100.

SUMMARY OF THE INVENTION

It is therefore an object of the present invention to provide a tablet pointer that can be held in the drag mode even when the operation surface of the tablet sheet is so narrow that the stylus pressure applied thereto needs to be temporarily removed while in the drag mode.

In a first aspect, the present invention is directed to a tablet pointer comprising: a tablet sheet; distance-traveled data generating means for generating distance-traveled data representing the distance of travel of a stylus pressed against the tablet sheet; switch data generating means for generating switch data representing the operating state of a mouse switch; and data output means for outputting, to a personal computer, device output data consisting of the distance-traveled data and the switch data provided in the same format as a mouse output format. The data output means outputs, as device output data in the mouse drag mode, the device output data that contains the distance-traveled data indicating the distance of travel of the stylus urged against the tablet sheet and the switch data indicating the depression of the mouse switch. When the switch data contained in the device output data in the mouse drag mode changes to switch data indicating the release of the mouse switch, the data output means outputs, as device output data for cancelling the drag mode, device output data containing that switch data. When it is switched to a keep-drag mode by a keep-drag mode signal from keep-drag mode select means, the switch data generating means does not generate the switch data indicating the release of the mouse switch until the keep-drag mode is cancelled by a keep-drag cancel signal from the keep-drag mode select means.

In a second aspect of the present invention, the switch data generating means generates the switch data indicating the operating state of the mouse switch on the basis of an operation pattern that is a combination of the time for the press-holding of the stylus to the tablet sheet and the time interval between such stylus press-holding operations.

In a third aspect of the present invention, the keep-drag mode select means is a push-button switch provided on the tablet pointer, which, upon each depression, outputs the keep-drag signal and the keep-drag cancel signal alternately with each other.

In a fourth aspect of the present invention, the keep-drag mode select means is a keep-drag mode select circuit, which outputs the keep-drag signal and the keep-drag cancel signal on the basis of an operation pattern different from the above-mentioned switch data generating pattern and formed by a combination of the time for the press-holding of the stylus to the tablet sheet and the time interval between such stylus press-holding operations.

In a fifth aspect of the present invention, when the tablet sheet is tapped once and then pressed, the switch data indicating the depression of the mouse switch in the drag mode is produced; when the pressure applied to the tablet sheet is removed in the drag mode, the switch data indicating the release of the mouse switch is produced; when the tablet sheet is tapped twice and then pressed, the switch data indicating the depression of the mouse switch in the keep-drag mode is produced; and when the tablet sheet is tapped once in the keep-drag mode, the keep-drag mode is cancelled and the switch data indicating the release of the mouse switch is produced.

In a sixth aspect, the present invention is directed to a tablet pointer comprising: a tablet sheet; distance-traveled data generating means for generating distance-traveled data representing the distance of travel of a stylus pressed against the tablet sheet; switch data generating means for generating switch data representing the operating state of a mouse switch; and data output means for outputting, to a personal computer, device output data consisting of the distance-traveled data and the switch data provided in the same format as a mouse output format. The data output means outputs, as device output data in the mouse drag mode, the device output data that contains the distance-traveled data indicating the distance of travel of the stylus urged against the tablet sheet and the switch data indicating the depression of the mouse switch. When the switch data contained in the device output data in the mouse drag mode changes to switch data indicating the release of the mouse switch, the data output means outputs, as device output data for cancelling the drag mode, device output data containing that switch data. The switch data generating means generates the switch data indicating the depression of the mouse switch on the basis of an operation pattern that is a combination of the time for press-holding the stylus to the tablet sheet and the time interval between such stylus press-holding operations. When it is switched to the drag mode, the switch data generating means does not generate the switch data indicating the release of the mouse switch until the tablet sheet is tapped at least once.

According to the first aspect of the present invention, when the device output data, which contains the distance-traveled data indicating the distance of travel of the stylus pressed against the tablet sheet and the switch data indicating the depression of the mouse switch, is output in the mouse output format, the personal computer recognizes it as device output data in the mouse drag mode.

When the switch data, in the device output data recognized as such in the drag mode, changes to the switch data indicating the release of the mouse switch, the personal computer recognizes it as device output data for cancelling the drag mode.

When put in the keep-drag mode by the keep-drag signal, the switch data generating means does not generate the switch data indicating the release of the mouse switch in response to an accidental drag mode cancelling operation; hence, the drag mode is retained.

Upon application of the keep-drag cancel signal to the switch data generating means, the keep-drag mode is cancelled.

According to the second aspect of the present invention, the switch data indicating the depression of the mouse switch and the switch data indicating its release are produced corresponding to the operation pattern formed by a combination of the time for the press-holding of the stylus to the tablet sheet and the time interval between such stylus press-holding operations. Accordingly, since the tablet sheet can be used also as a tablet sheet for generating the distance-traveled data, no push-button switch is needed to produce the switch data.

According to the third aspect of the present invention, upon each depression of the push-button provided on the tablet pointer, the tablet pointer alternately enters and leaves the keep-drag mode. Since the keep-drag mode can be chosen by the operation of the push-button switch, it is possible to enter or exit the keep-drag mode as necessary while pressing the stylus against the tablet sheet in the drag mode.

According to the fourth aspect of the present invention, the keep-drag mode select circuit judges the operation pattern combining the time for press-holding the stylus to the tablet sheet and the time interval between such stylus press-holding operations and performs the switching to the keep-drag mode and its cancellation. Since the table sheet can be used also to generate the distance-traveled data, no push-button switch is needed to select the keep-drag mode.

According to the fifth aspect of the present invention, when the tablet sheet is tapped once and the stylus is pressed against and dragged thereon, the device output data in the drag mode is output, and when the stylus is lifted off the tablet sheet, the drag mode is cancelled.

When the tablet sheet is tapped twice and the stylus is pressed-dragged thereon, the device output data in the drag mode is output in the keep-drag mode; and when the tablet sheet is tapped once while in the keep-drag mode, the keep-drag mode is cancelled and the drag mode in the keep-drag mode is also cancelled. Thus, since the generation of the switch data and the selection of the keep-drag mode can be done by operating the tablet sheet that is used primarily for producing the distance-traveled data, no push-button switch is needed for generating the switch data and for the selecting the keep-drag mode.

According to the sixth aspect of the present invention, when the device output data, which contains the distance-traveled data indicating the distance of travel of the stylus on the tablet sheet and the switch data indicating the depression of the mouse switch, is output in the mouse output format, the personal computer recognizes it as the device output data in the mouse drag mode.

When the switch data in the device output data recognized as the drag mode data changes to switch data indicating the release of the mouse switch, the personal computer recognizes it as device output data for cancelling the drag mode.

By merely removing the stylus pressure applied to the tablet sheet in the drag mode, the switch data generating means does not produce the switch data indicating the release of the mouse switch and the drag mode is not cancelled.

When tapping the tablet sheet at least once in the drag mode after removing the stylus pressure therefrom, the drag mode is cancelled.

DESCRIPTION OF THE PREFERRED EMBODIMENTS

An embodiment of the present invention will hereinbelow be described with reference to the drawings, in which the parts corresponding to those in the prior art examples are identified by the same reference numerals and no description will be repeated about them.

Figure 2:
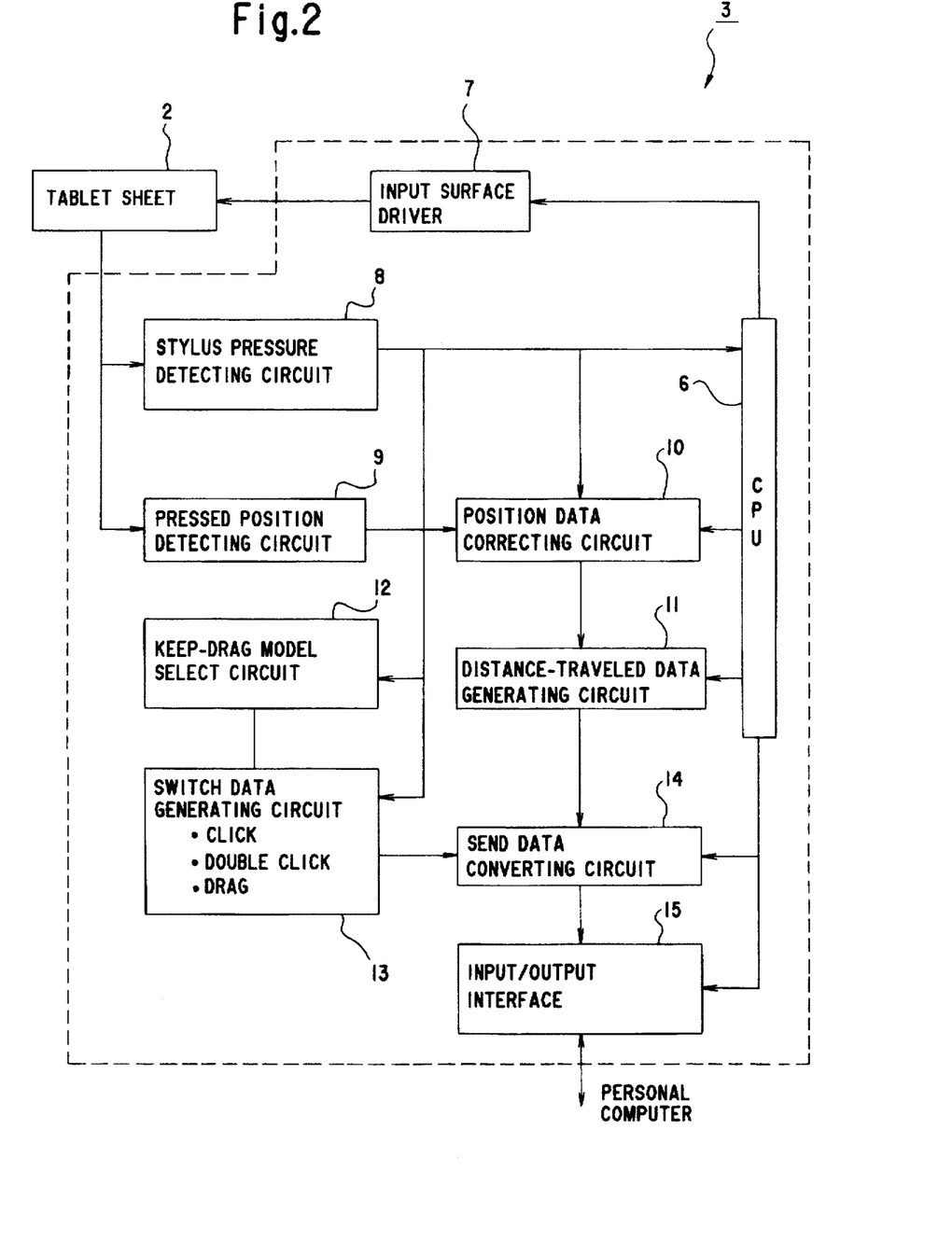
FIG. 2 is a block diagram illustrating the construction of the tablet pointer 3.

FIG. 2 illustrates in block form the construction of the tablet pointer 3 according to this embodiment.

The tablet sheet 2 of the tablet pointer 3 is what is called a resistor contact type tablet. The tablet sheet 2 of this type has a pair of opposed tablet films each coated over the entire area of one side having a homogeneous resistance layer and separated by an insulating gap with resistance layers facing each other. The potential at the position where the stylus is being pressed to one of the opposed films is detected via the other film to detect that position on the tablet sheet 2. To detect the x and y coordinates of the position of the stylus on the tablet sheet 2, a voltage is applied to the opposed films alternately with each other to form thereon potential gradients that cross at right angles and such a potential gradient on each film is detected via the other film.

This potential gradient is formed by an input surface driver 7 which is connected to the tablet sheet 2 and placed under the control of a central control circuit or control processing unit (hereinafter referred to as a CPU) 6.

The tablet sheet 2 also has connected to it a stylus pressure detecting circuit 8 and a pressed position detecting circuit 9. The stylus pressure detecting circuit 8 monitors the potential of one of the opposed films and detects the engagement and disengagement of the stylus with and from, respectively, the tablet sheet on the basis of potential changes that are caused when one of the two films is pressed into and released from contact with the other film.

The pressed position detecting circuit 9 is connected to an unenergized one of the opposed tablet films which are alternately supplied with a voltage and converts the potential at the pressed position, defined by the x and y coordinates, from analog ("A") to digital ("D") form to obtain an 8-bit absolute position data. The absolute position data thus periodically analog to digital or A/D converted is fed to a position data correcting circuit 10.

The position data correcting circuit 10 is connected to the outputs of the stylus pressure detecting circuit 8 and the pressed position detecting circuit 9 and detects the correlation between the stylus pressure to the tablet sheet 2 detected by the circuit 8 and plural pieces of absolute position data detected by the circuit 9 to eliminate abnormal absolute position data.

Connected to the output of the position data correcting circuit 10 is a distance-traveled data generating circuit 11. Upon each input thereinto of the absolute position data from the position data correcting circuit 10, the distance-traveled data generating circuit computes the difference between it and the immediately preceding data and outputs the difference as the aforementioned distance-traveled data (X, Y). The distance-traveled data is computed for each of the x and y coordinates, and hence it represents the distance of travel of the stylus on the tablet sheet 2 by an 8-bit value of distances (X, Y) in the x and y directions.

Upon each input of new absolute position data into the position data correcting circuit 10, the distance-traveled data (X, Y) is computed and fed to a send data converting circuit 14.

The output of the stylus pressure detecting circuit 8 is connected to a keep-drag mode select circuit 12 and a switch data generating circuit 13 as well as to the position data correcting circuit 10.

The keep-drag mode select circuit 12 is keep-drag mode select means for generating a keep-drag signal and a keep-drag cancel signal on the basis of the output from the stylus pressure detecting circuit 8.

In the keep-drag mode select circuit 12, a signal indicating the press-holding of the stylus to the tablet sheet 2 and a signal indicating the removal of the stylus pressure, both fed from the stylus pressure detecting circuit 8, are used to calculate the time for which the stylus is being press-held to the tablet sheet 2 and the time intervals between such stylus press-holding operations. When the stylus press-holding time and the time intervals between the stylus press-holding operations satisfy any one of the conditions for operation defined in Table 4, the keep-drag mode select circuit 12 judges that an operation pattern for the keep-drag mode or for cancelling the keep-drag mode is input thereinto and provides the keep-drag signal or keep-drag cancel signal to the switch data generating circuit 13.

TABLE 4

| | Operation Patterns Defined | | Operation Mode |
|---|---|---|---|
| (a) |  | After the input of the tapping data, the press data are inputted within tb, during which period the distance-traveled data are inputted. | Keep-drag |
| (b) |  | When the stylus pressure to the tablet sheet is removed in the keep-drag mode, the tapping data are inputted within tb. | Keep-darg Cancelled |

Table 4(a) shows an condition for an operation pattern for switching to the keep-drag mode. When the tablet sheet 2 is tapped twice and then the stylus is press-held to and dragged on the tablet sheet 2, the keep-drag mode occurs.

To discriminate between tapping of the tablet sheet 2 and other pressure-applying operations, it is defined in this embodiment that the tablet sheet 2 is tapped once when the time $t_a$ of pressing the tablet sheet 2 by tapping is in the range from 10 to 200 msec and twice in succession when the time interval $t_c$ between tapping operations is in the range of 30 to 300 msec.

Another criterion for judgment of the keep-drag mode is that the tablet sheet 2 be pressed within one second after the second tapping.

Table 4(b) shows the condition for an operation pattern for cancelling the keep-drag mode. When the stylus pressure to the tablet sheet 2 is removed in the keep-drag mode and is then tapped once, the keep-drag mode is cancelled.

A tap on the tablet sheet 2 within one second after the removal therefrom of the stylus pressure is used as a criterion for judgment for the cancellation of the keep-drag mode—this prevents the occurrence of malfunctions by other operations.

The switch data generating circuit 13, which is connected to the keep-drag mode select circuit 12, produces switch data indicating the operating state of the mouse switch on the basis of the keep-drag signal and the keep-drag cancel signal from the keep-drag mode select circuit 12 and the signals from the stylus pressure detecting circuit 8 which indicate the stylus pressure applied to the tablet sheet 2 and the removal therefrom of the stylus pressure, respectively.

The switch data generating circuit 13 responds to the keep-drag signal to enter the keep-drag mode and responds to the keep-drag cancel signal to leave the keep-drag mode.

The operations unique to the mouse, such as clicking and dragging, are usually carried out by actuating the left one of a pair of mouse switches; accordingly, the switch data by the switch data generating circuit 13 represents the state of actuation of the left switch of the mouse.

While not in the keep-drag mode (that is, while in a normal mode), the switch data generating circuit 13 produces switch data corresponding to the operations specific to the mouse independently of the keep-drag mode select circuit 12.

That is to say, the switch data generating circuit 13 also calculates the time of press-holding the stylus to the tablet sheet 2 and the time intervals between such stylus press-holding operations on the basis of the signals from the stylus pressure detecting circuit 8 which indicate the stylus pressure to the tablet sheet 2 and the removal therefrom of the stylus pressure, respectively; and the thus calculated time and time intervals are compared with the conditions for operation patterns defined in Table 5.

When the above-mentioned time and time intervals satisfy any one of the predefined conditions, the switch data generating circuit 13 judges that the operation pattern corresponding to the operation unique to the mouse is input thereinto, and it produces switch data R corresponding to the mouse switch operation.

TABLE 5

| | Operation Patterns Defined | | Operation Mode |
|---|---|---|---|
| (c) |  | The press-holding time is ta, and thereafter there is no tapping operation within tb. | Single Click |
| (d) |  | The next tapping data are inputted tb after the input of the first tapping data. | Double Click |
| (e) |  | After the input of tapping data, the press data are inputted within tb, during which period the distance-traveled data are inputted. | Drag |
| (f) |  | The press of tablet sheet is cancelled in the normal drag mode. | Drag Cancelled |

In Table 5, (c) to (f) show the relationships between the operations specific to the mouse and the corresponding predefined operating conditions. The conditions for operation are defined as follows: single tapping of the tablet sheet 2 corresponds to a "single click," double successive tapping of the tablet sheet 2 corresponds to a "double click," single tapping followed by dragging of the stylus press-held to the tablet sheet 2 corresponds to the "drag mode," and removal of the stylus from the tablet sheet 2 in the "drag mode" corresponds to the "cancellation of the drag mode."When judging that the input thereto is the "single click," the switch data generating circuit 13 sequentially outputs bits "1" and "0, " the switch data R indicating the depression of the left switch of the mouse and the release of the left switch of the mouse, respectively. Similarly, when judging that the input thereto is the "double click," the switch data generating circuit 13 sequentially outputs bits "1," "0," "1" and "0," the switch data R indicating the repetition of the depression of the left switch of the mouse and the release of the left switch of the mouse.

When judging that the input thereto is in the "drag mode," the switch data generating circuit 13 outputs a bit "1"

indicating the depression of the left switch of the mouse, and when judging that the input thereto is in the "cancellation of the drag mode," it outputs a bit "0" indicating the release of the left switch.

Each time such switch data R is produced by the switch data generating circuit 13, it is fed to the send data converting circuit 14 connected to the output of the switch data generating circuit 13.

On the other hand, when supplied with the keep-drag signal from the keep-drag mode select circuit 12, the switch data generating circuit 13 enters the keep-drag mode and, as in the case of judging the "drag mode," it outputs a "1," indicating the depression of the left switch of the mouse, and provides the output "1" to the send data converting circuit 14.

While in the keep-drag mode, the switch data generating circuit 13 ignores signals input from the stylus pressure detecting circuit 8. That is, it does not make the judgment for the operations defined in (c) to (f) in Table 5, until the switch data generating circuit 13 receives the keep-drag mode cancel signal next.

Accordingly, even if the stylus pressure applied to the tablet sheet 2 is removed therefrom in the keep-drag mode, it is not judged as the "cancellation of the drag mode" and switch data "0," indicating the release of the left switch of the mouse, is not produced either.

When supplied with the keep-drag mode cancel signal, the switch data generating circuit 13 exits the keep-drag mode and enters the aforementioned normal mode and, as in the case of judging the "cancellation of the drag mode," it produces a "0" indicating the release of the mouse left switch and provides the output "0" to the send date converting circuit 14.

Incidentally, since in this embodiment the selection of the keep-drag mode and the generation of the switch data are carried out by operations through the tablet sheet 2, different operation patterns are used for selecting the keep-drag mode and for generating the switch data.

The send data converting circuit 14 receives the switch data R from the switch data generating circuit 13 and the distance-traveled data (X, Y) from the distance-traveled data generating circuit 11. When supplied with the switch data R different from the immediately preceding switch data R or distance-traveled data that is not a "0, " that is, distance-traveled data indicating the dragging of the stylus urged against the tablet sheet 2, the send data converting circuit 14 produces device output data in the format of the mouse shown in Table 1.

Usually, since a change in the switch data R does not mean a change in the position of the stylus pressure applied the tablet sheet 2, the send data converting circuit 14 produces the device output data that consists of the switch data R having undergone the change and distance-traveled data (0, 0) indicating no change in the position of the stylus pressed against the tablet sheet 2.

When supplied with distance-traveled data indicating the dragging of the stylus on the tablet sheet 2, the send data converting circuit 14 produces device output data that consists of distance-traveled data (X, Y) indicating the distance of travel of the stylus on the tablet sheet 2 and the latest switch data R.

The device output data thus produced by the send data converting circuit 14 is fed via an input/output or I/O interface 15 to the PC 1.

As illustrated in FIG. 2, the position data correcting circuit 10, the distance-traveled data generating circuit 11, the send data converting circuit 14 and the input/output or I/O interface 15 are all connected to the CPU 6 and their input/output data is placed under the control of the CPU 6. The circuits surrounded by the broken lines, except the tablet sheet 2, are integrated into a one-chip microcomputer 16.

Figure 1:
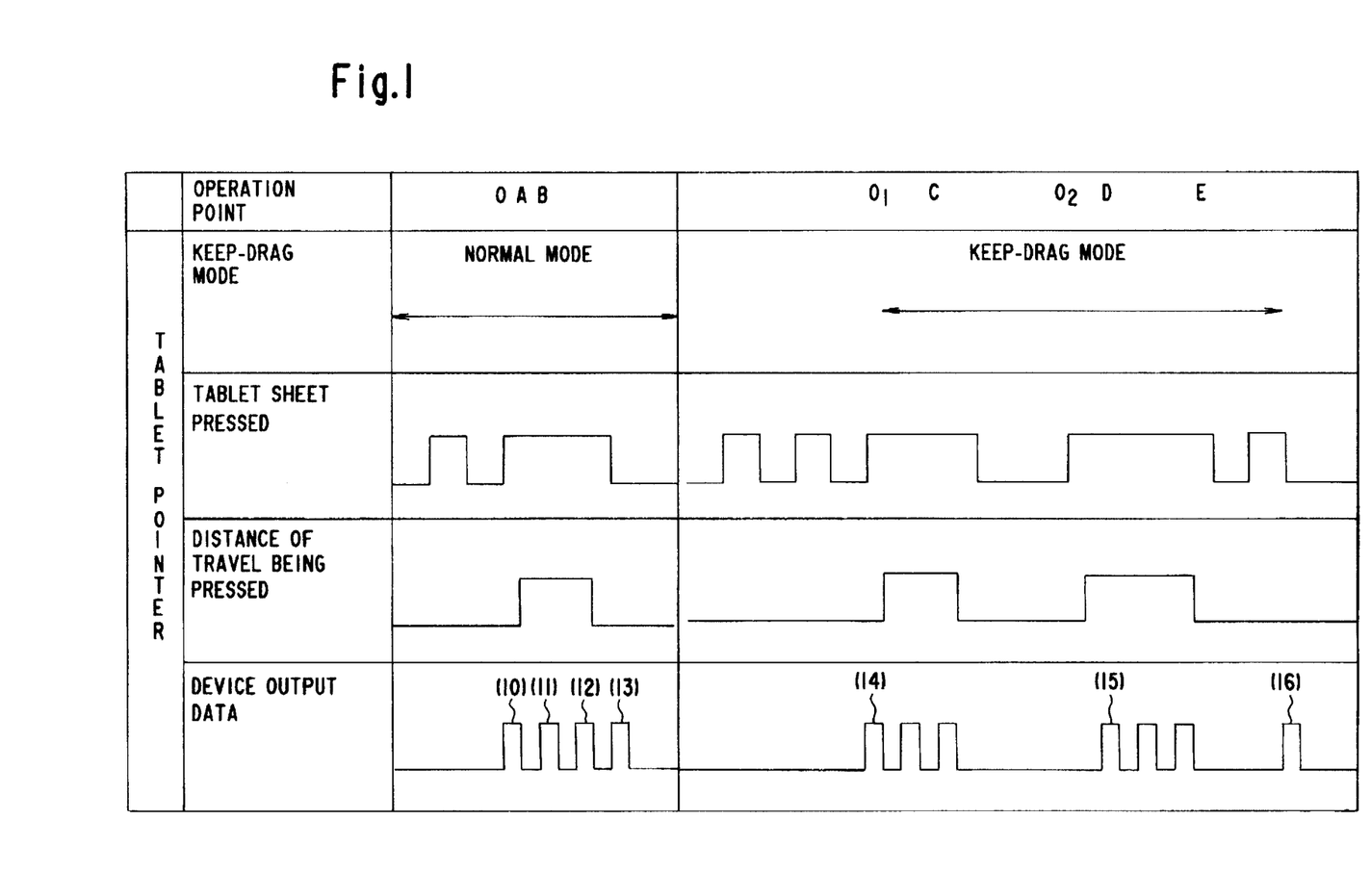
FIG. 1 is a waveform diagram showing the relationships between the operations of a tablet pointer 3 and device output data in a first embodiment of the present invention.

Next, a description will be given, with reference to FIGS. 1, 5 and 6, of the operation of the tablet pointer 3 of such a construction as described above. FIG. 1 is a waveform diagram showing the relationships between manipulations of the tablet pointer 3 and device output data in the drag mode and in the keep-drag mode.

For example, in the case where the stylus press-held to the tablet sheet 2 can be continuously dragged thereon from the point "O" to "B" in FIG. 5, this operation is decided as dragging in the normal mode, in which case the tablet sheet 2 is tapped once at the position "O" and within one second the stylus is pressed against it again and dragged toward the point "B" as shown in FIG. 1. This operation pattern is identified as the "drag mode" operation pattern in Table 5(e) and device output data (10) that the switch data R has changed to a "1" is produced first (see Table 6).

TABLE 6

|      | Switch Data | | Distance-traveled Data | |
|------|---|---|---|---|
|      | L | R | X | Y |
| (10) | 1 | 0 | 0 | 0 |
| (13) | 0 | 0 | 0 | 0 |
| (14) | 1 | 0 | 0 | 0 |
| (15) | 1 | 0 | $X_D$ | $Y_D$ |
| (16) | 0 | 0 | 0 | 0 |

After this, device output data (11) and (12), which contain the distance-traveled data (X, Y) indicating the dragging of the stylus on the tablet sheet 2 following the single tap thereon, are produced as device output data in the drag mode.

When the stylus pressure applied to the tablet sheet 2 is removed therefrom at the position "B," it is identified as the "drag mode cancel" and device output data (13) that the switch data R has changed to a "0" is produced as the device output data for cancelling the drag mode.

These pieces of device output data (10) to (13) are identical with the aforementioned pieces of mouse output data (1) to (4) in the corresponding drag mode. Thus, the stylus dragging operation can be performed as if the mouse were dragged.

In the case of terminating the press-holding of the stylus to the tablet sheet 2 twice or more as in the press-dragging from the point "O₁" to "E" in FIG. 6, the stylus is dragged in the keep-drag mode.

As depicted in FIG. 1, in the case of switching the normal mode to the keep-drag mode, the tablet sheet 2 is tapped twice at the position "O₁" and within one second thereafter the stylus is pressed against the tablet sheet 2 and pressed dragged thereon toward the point "C." The keep-drag mode select circuit 12 decides that this operation pattern is the "keep-drag" operation pattern defined in Table 4(a), and device output data (14) that the switch data R has changed to a "1" is produced first (see Table 6).

Thereafter, when the stylus is press-dragged to the position "C" on the tablet sheet 2, device output data containing the distance-traveled data (X, Y) indicative of the press-dragging is produced as device output data in the drag mode.

In this instance, the stylus pressure applied to the tablet sheet 2 is temporarily removed therefrom at the point "C"

and the press-dragging is resumed at the point "O₂" toward the point "E." But since signals from the stylus pressure detecting circuit 8 are ignored during the temporary removal of the stylus pressure, the switch data R does not change whether or not the stylus pressure is removed from the tablet sheet 2 and whether or not the stylus is press-held to the tablet. Hence, device output data for cancelling the drag mode is not produced as depicted in FIG. 1.

As the stylus is press-dragged again from the point "O₂," device output data (15) containing distance-traveled date ($X_D$, $Y_D$) is produced. This device output data (15) exists in the drag mode, as is the case with the device output data generated when the stylus was press-dragged to the point "C."

Giving the tablet sheet 2 a single tap after removal of the stylus pressure from the tablet sheet 2 at the point "E," the keep-drag mode select circuit 12 identifies this operation pattern as the "keep-drag cancel" operation pattern. Then, the switch data generating circuit 13 returns to the normal mode and outputs to the send data converting circuit 14 switch data R that is a "0". As a result, device output data (16) that the switch data R has changed to a "0" is produced as device output data for cancelling the drag mode.

Thus, the dragging of the stylus in the keep-drag mode will not immediately be terminated even if the stylus pressure to the tablet sheet 2 is removed during the press-dragging.

While this embodiment has been described to set the keep-drag mode and the normal mode with a view to preventing the dragging of the stylus from being interrupted by the temporary removal of the stylus pressure from the tablet sheet 2, it is not always necessary to set the keep-drag mode.

Figure 3:
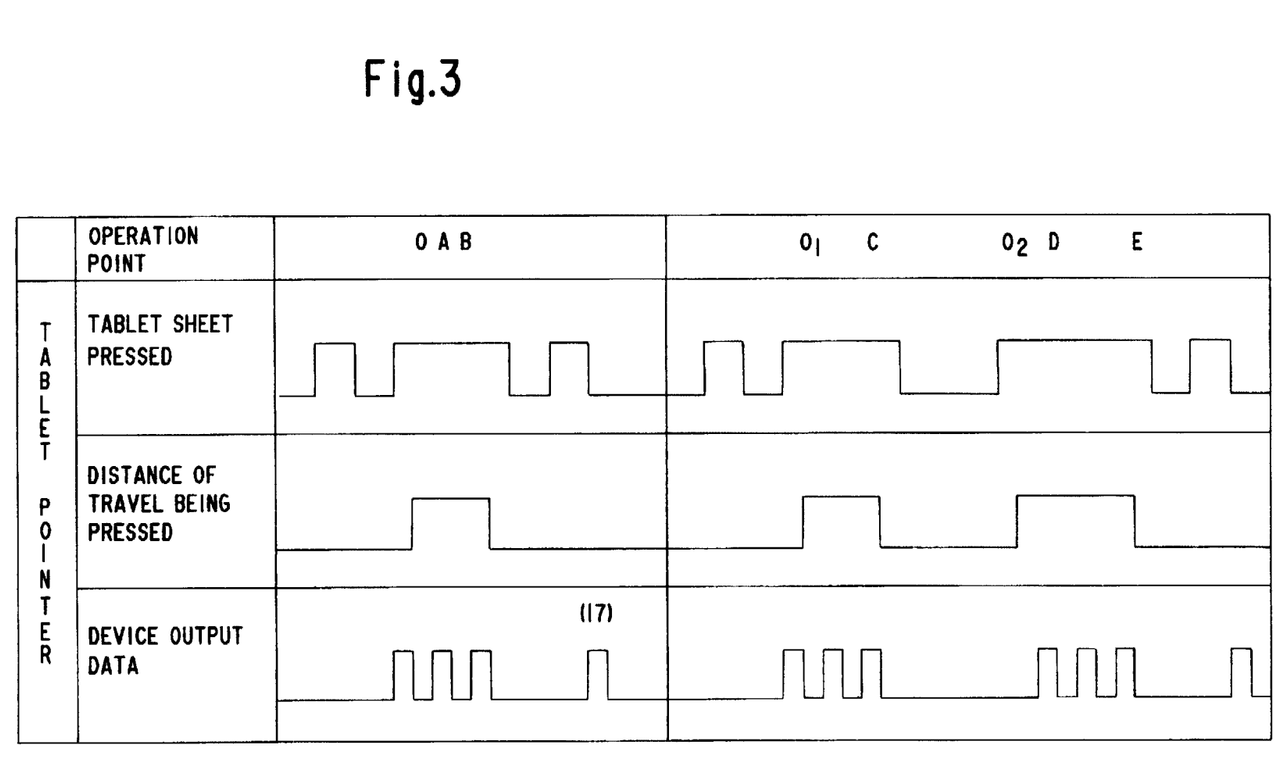
FIG. 3 is a waveform diagram showing the relationships between the operations of the tablet pointer 3 and device output data in a second embodiment of the present invention.

Turning now to FIG. 3, the operation of the tablet pointer 11 will be described in connection with the case where the stylus is dragged as depicted in FIGS. 5 and 6.

In the dragging of the stylus from the point "O" to "B" in FIG. 5, the stylus pressure is removed from the tablet sheet 2 at the points "O" and "B" and the tablet sheet 2 is tapped, thereby switching to the drag mode and cancelling it.

With the tablet pointer 11 of this embodiment, even if it is expected that the dragging of the stylus needs to be carried out by two press-dragging operations as in the case of dragging from the points "O₁" to "E," it is possible to enter the drag mode by the same operation pattern as that for the dragging from the point "O" to "B." That is, by one tapping of the tablet sheet 2.

Further, even if the stylus pressure to the tablet sheet 2 is temporarily removed between the points "C" and "O₂," since this is not the predefined "drag mode cancel" operation pattern, the switch data R does not change and the device output data for cancelling the drag mode is not produced either.

It is possible to leave the drag mode by tapping the tablet sheet 2 after lifting the stylus off the tablet sheet 2 at the position "E" and this operation is identical with the aforementioned one at the position "B."Hence, according to this embodiment, there is no need to use different operation patterns for dragging operations in FIGS. 5 and 6. Furthermore, even if the stylus pressure is removed from the tablet sheet 2, the drag mode can be retained.

The present invention is not limited specifically to the above embodiments and can be modified in various ways.

For example, although the first embodiment selects the keep-drag mode by using the operation pattern of the tablet sheet 2, it is possible to select the keep-drag mode by

TABLE 7

Table 7 shows defined operation patterns for the "drag mode" and the "drag mode cancel" of a tablet pointer 11 according to a second embodiment of the present invention which does not set the keep-drag mode. Only by changing the defined "drag mode cancel" operation in the first embodiment, can the keep-drag mode select circuit 12 be dispensed with.

In the second embodiment, the drag mode can be cancelled by removing the stylus pressure from the tablet sheet 2 in the drag mode and tapping it within the time $t_b$ thereafter. Accordingly, the drag mode will not be cancelled by merely removing the stylus pressure applied to the tablet sheet 2 so far. In this embodiment, the time $t_b$ is set to one second.

depressing the push-button switch 4 provided on the tablet pointer 3 as shown in FIG. 4.

By outputting the keep-drag signal and the keep-drag cancel signal alternately to the switch data generating circuit 13 upon each manipulation of the push-button switch 4, the keep-drag mode select circuit 12 can be substituted with the switch 4.

With the use of the push-button switch 4, the stylus dragging in the normal mode can be switched to the keep-drag node operation and, conversely, the dragging in the keep-drag mode can also be returned to the normal mode operation.

The operation patterns for the "keep-drag" operation for switching to the keep-drag mode and for the "keep-drag cancel" operation for cancelling the keep-drag mode are not limited specifically to the operation patterns defined in Table 4, but can be changed to some other patterns as long as they are not the same as the switch data generating patterns defined in Table 5.

While in the above the tablet sheet 2 has been described to be what is called a resistor contact type tablet sheet that detects the position of the stylus pressure applied thereto from the potential at that position thereon, the tablet sheet may be the same as position detecting means adopted in other conventional tablets. It is possible to employ position detecting means that detects the position of, for example, a finger brought close thereto through utilization of a change in the electrostatic capacitance at that position. With such an electrostatic capacitance type tablet sheet, the position of operation close to it is used as the position where the tablet sheet is pressed.

As will be appreciated from the above, the present invention has advantages such as described as follows.

According to the first aspect of the present invention, even if the operation surface of the tablet sheet 2 is so narrow that the press-dragging of the stylus thereon in the drag mode needs to be terminated, the drag mode can be retained because the keep-drag mode is used to prevent the device output data for cancelling the drag mode from being produced in response to mere removal of the stylus pressure from the tablet sheet 2.

Since the stylus can be dragged by the same operation as in the past when not in the keep-drag mode, a user need not learn new manipulations for normal operations. Besides, the tablet pointer of the present invention can be realized simply by introducing the keep-drag mode select means into the conventional tablet pointer and modifying processing in the drag mode.

According to the second aspect of the present invention, since it is possible to enter the drag mode by an operation pattern that is a combination of the time of the press-holding of the stylus to the tablet sheet and the time interval between such stylus press-holding operations, the tablet pointer can be handled with one hand and is free from the necessity of providing thereon the push-button switch corresponding to the left switch of the mouse.

According to the third aspect of the present invention, since the keep-drag mode can be selected by a push-button manipulation, it is possible to switch the press-dragging of the stylus in the normal mode to the keep-drag mode operation and vice versa.

According to the fourth aspect of the present Invention, since the keep-drag mode can be selected by the operation pattern that is a combination of the time of the press-holding of the stylus to the tablet sheet and the time interval between such stylus press-holding operations, it is possible to select the keep-drag mode by an operation continuous to the dragging operation at the start and end of the dragging.

According to the fifth aspect of the present invention, no push-button switch is needed for generating the switch data and for selecting the keep-drag mode, because the tablet sheet manipulation for the generation of the distance-traveled data can be used also for the producing the switch data and for selecting the keep-drag mode.

According to the sixth aspect of the present invention, even if the operational surface of the tablet sheet 2 is so narrow that the press-dragging of the stylus thereon in the drag mode needs to be terminated, the drag mode can be retained because the keep-drag mode is used to prevent the device output data for cancelling the drag mode from being produced in response to mere removal of the stylus pressure from the tablet sheet 2.

Moreover, since the same operation pattern can be used in common to the normal drag operation and the drag operation required to be suspended twice or more, the operation need not be changed for each drag. Besides, even if the stylus pressure to the tablet sheet 2 is removed in the course of the press-dragging of the stylus thereon, the drag mode can be retained.

It will be apparent that many modifications and variations may be effected without departing from the scope of the novel concepts of the present invention.

What is claimed is:

1. A tablet pointer comprising:

a tablet sheet;

distance-traveled data generating means for generating distance-traveled data representing the distance of travel of a stylus pressed against said tablet sheet;

switch data generating means for generating switch data representing an operating state of a mouse switch;

keep-drag mode select means for generating a keep-drag mode signal and a keep-drag cancel signal, and for outputting one of said keep-drag mode signal and said keep-drag cancel signal into said switch data generating means; and data output means for outputting, to a personal computer, device output data consisting of said distance-traveled data and said switch data provided in a similar same format to a mouse output format;

wherein said data output means outputs, as device output data in a mouse drag mode, said device output data that contains said distance-traveled data indicating distance of travel of said stylus press-held to said tablet sheet and said switch data indicating depression of said mouse switch, when said switch data contained in said device output data in said mouse drag mode changes to switch data indicating a release of said mouse switch, said data output means outputs, as device output data for cancelling said drag mode, device output data containing said switch data, and wherein when said switch data generating means is switched to a keep-drag mode by said keep-drag mode signal from said keep-drag mode select means, said switch data generating means does not generate said switch data indicating said release of said mouse switch until said keep-drag mode is cancelled by said keep-drag cancel signal from said keep-drag mode select means.

2. The tablet pointer of claim 1, characterized in that said switch data generating means generates said switch data indicating said operating state of said mouse switch based on an operation pattern that is a combination of the time for the press-holding of said stylus to said tablet sheet and time intervals between such stylus press-holding operations.

3. The tablet pointer of claim 1 or 2, characterized in that said keep-drag mode select means is a push-button switch provided on said tablet pointer and that, whenever depressed, said push-button switch outputs said keep-drag signal and said keep-drag cancel signal alternately with each other.

4. The tablet pointer of claim 2, characterized in that said keep-drag mode select means is a keep-drag mode select circuit and outputs said keep-drag signal and said keep-drag cancel signal based on an operation pattern that is different from said switch data generating pattern and is a combination of said time for press-holding of said stylus to said tablet sheet and time interval between such stylus press-holding operations.

5. The tablet pointer of claim 4, characterized in that when said tablet sheet is tapped once and then pressed, said switch data indicating depression of said mouse switch in said drag mode is produced and when pressure, applied to said tablet sheet, is removed in said drag mode, said switch data indicating release of said mouse switch is produced, and that when said tablet sheet is tapped twice and then pressed, said switch data indicating depression of said mouse switch in said keep-drag mode is produced and that when said tablet sheet is tapped once in said keep-drag mode, said keep-drag mode is cancelled and said switch data indicating release of said mouse switch is produced.

6. A tablet pointer, comprising:

a tablet sheet;

distance-traveled data generating means for generating distance-traveled data representing the distance of travel of a stylus pressed against said tablet sheet;

switch data generating means for generating switch data representing an operating state of a mouse switch; and data output means for outputting, to a personal computer, device output data consisting of said distance-traveled data and said switch data provided in a similar same format to a mouse output format, wherein said data output means outputs, as device output data in a mouse drag mode, said device output data that contains said distance-traveled data indicating distance of travel of said stylus pressed against said tablet sheet and said switch data indicating the depression of said mouse switch, wherein when said switch data contained in said device output data in said mouse drag mode changes to switch data indicating release of said mouse switch, said data output means outputs, as device output data for cancelling said drag mode, device output data containing said switch data, wherein said switch data generating means generates said switch data indicating said depression of said mouse switch based on an operation pattern that is a combination of time for press-holding said stylus to said tablet sheet and time interval between such stylus press-holding operations, and wherein when said switch data generating means is switched to said drag mode, said switch generating means does not generate said switch data indicating release of said mouse switch until said tablet sheet is tapped at least once.

* * * * *